United States Patent

[11] 3,589,269

| [72] | Inventor | John E. Weir, Sr.<br>Vine Grove, Ky. |
|---|---|---|
| [21] | Appl. No. | 865,426 |
| [22] | Filed | Oct. 10, 1969 |
| [45] | Patented | June 29, 1971 |
| [73] | Assignee | Weir Magic Pit Corporation<br>Frankfort, Ky.<br>Continuation-in-part of application Ser. No.<br>748,726, July 30, 1968. |

[54] AUTOMATIC BARBECUE OVEN
11 Claims, 4 Drawing Figs.

[52] U.S. Cl. ................................................. 99/259,
99/332, 99/342, 99/400, 99/446
[51] Int. Cl. ................................................... A23b 1/00
[50] Field of Search .................................... 99/259,
260, 261, 229, 327, 421, 447, 326; 126/25, 59.5

[56] References Cited
UNITED STATES PATENTS
| 1,870,170 | 8/1932 | Browning | 99/327 |
|---|---|---|---|
| 2,558,569 | 6/1951 | Koch | 99/421-V X |
| 2,790,434 | 4/1957 | Del Francia | 99/447 |
| 3,034,420 | 5/1962 | Wenger | 99/327 X |
| 3,266,409 | 8/1966 | Oyler | 99/259 |
| 3,333,526 | 8/1967 | Kirkpatrick | 99/260 |
| 3,375,775 | 4/1968 | Folmar | 99/259 X |
| 3,444,805 | 5/1969 | Happel et al. | 99/421 R X |

Primary Examiner—Walter A. Scheel
Assistant Examiner—Arthur O. Henderson
Attorney—William R. Price ABSTRACT: Discloses a barbecue oven designed for unattended operation through the use of an electrically powered heating unit, and a pyrolytic smoke forming surface, heated by said heating unit and interposed between the barbecuing chamber and the heating coil so as to receive and pyrolyze meat drippings from the barbecue chamber to provide smoke within the oven. The electrically powered heating unit is thermostatically controlled through the use of a thermal sensing unit within the barbecuing chamber and is timed through the use of a timer so as to cook the meat for a specified time.

INVENTOR
JOHN E. WEIR, SR.
BY
Wm. R. Price
ATTORNEY 3,589,269

1

AUTOMATIC BARBECUE OVEN

CROSS REFERENCE TO RELATED APPLICATION

This application is a continuation in part of my copending application entitled "BARBECUE OVEN," Ser. No. 748,726, and filed July 30, 1968.

FIELD OF THE INVENTION

This invention relates to improvements in a closed barbecue oven which will allow for continuous and unattended operation and which will minimize the danger of grease fires.

DESCRIPTION OF THE PRIOR ART

Meat cooked by direct exposure to gases and smoke, given off by burning wood or charcoal is known as barbecue. Traditionally, meat cooked by this method has been disposed on a grill, directly over a bed of coals so that the heat and smoke emanating from the coals passed upwardly around the meat to cook same. A problem with conventional barbecue has been in the fact that there was no uniform way to control the heat supply to the meat and to facilitate smoking of the coals in a uniform manner so that the smoke and heat penetrated throughout the meat to impart a characteristic barbecue flavor. As a result, in some instances, the coals would become too hot and the meat would sear or burn on one side while being undercooked and raw on the other. It was also necessary to constantly attend the pit, adding fuel or in some cases, wetting the fuel by sprinkling with water or with wet sawdust to produce smoke and by manipulating the coals to maintain the coalbed and the smoke and the heat emanating therefrom at a constant and uniform level. For these reasons, and for the reason of the difficulty and expense of obtaining competent help, many commercial institutions and restaurants have been unable to provide a good barbecue and consequently, this item has not been served in many eating establishments.

Many proposals have been made as to closed cooking units, all of which have met with considerable difficulty. One of the problems was in the disposition of the meat drippings and grease from the meat which in the conventional open pit barbecue, fed directly into the coalbed to facilitate smoke formation and to impart a characteristic flavor to the cooked meat. In the closed ovens, however, the meat drippings had to be diverted to a drip pan and removed from the oven with the concomitant danger of a grease fire in the closed unit. One previous patentee, Rau, in U.S. Pat. No. 2,626,559 appreciated the desirability of directing meat drippings back to the coalbed to facilitate smoke formation and to impart the characteristic savory flavor of smoke to the barbecued meat. Nevertheless, Rau appreciated the problem of grease fires in that he suggested, also, the addition of wet sawdust to the coalbed to control the rate of combustion in the coal bed, and to control smoke formation.

Further, most of the prior art patentees have encountered some difficulty in maintaining a uniform temperature in the cooking chamber due to the fact that the temperature sensing elements in the barbecuing oven operated thermostatically controlled solenoid mechanisms to fully open and fully close the air intake to the fuel compartment. Therefore, the air intake was either fully opened or fully closed. This resulted in fluctuations in temperature due to the fact that the coalbeds could not be adequately controlled by intermittent air supply through a full open or through a full closed inlet damper.

SUMMARY OF THE INVENTION

According to the present invention, unattended operation of the barbecue oven is attained by providing a uniform thermostatically controlled temperature in the barbecuing chamber through the use of a thermostatically controlled electrical heating unit and through the use of a timing apparatus. Thus, through a temperature sensing device in the cooking chamber, power to the electrical heating coil is intermittently switched on and off. Further the specified cooking time is governed by a timing device. Smoke is provided to impart the characteristic flavor to the barbecue by directing the drippings from the meat to a pyrolytic smoke producing surface in the form of a drip pan having a metal plate base interposed between the barbecuing chamber and the electrical heating unit.

Thus, in an oxygen poor atmosphere, within the heat and smoke producing chamber, grease and meat drippings are pyrolyzed on a pyrolytic surface provided by a drip pan having a sheet metal base and peripheral sidewalls and which is heated to pyrolytic temperature by the electrical heating unit. Thus the pyrolytic surface receives the grease and meat drippings from the barbecuing chamber, pyrolyzes same in an oxygen poor atmosphere to form smoke to flavor the meat without the danger of a grease fire. Further, moisture produced by combustion of hydrocarbons through pyrolysis plus the moisture of the evaporated meat drippings and barbecue sauce, humidifies the cooking chamber 8 so as to reach equilibrium between the moisture in the meat and the moisture in the atmosphere with the result that there is less shrinkage of the cooked meat. The resulting cooked meat is much more moist than has been the case with the conventional open pit barbecue, wherein excess moisture was evacuated in the atmosphere.

DESCRIPTION OF THE PREFERRED EMBODIMENT

Figure 1:
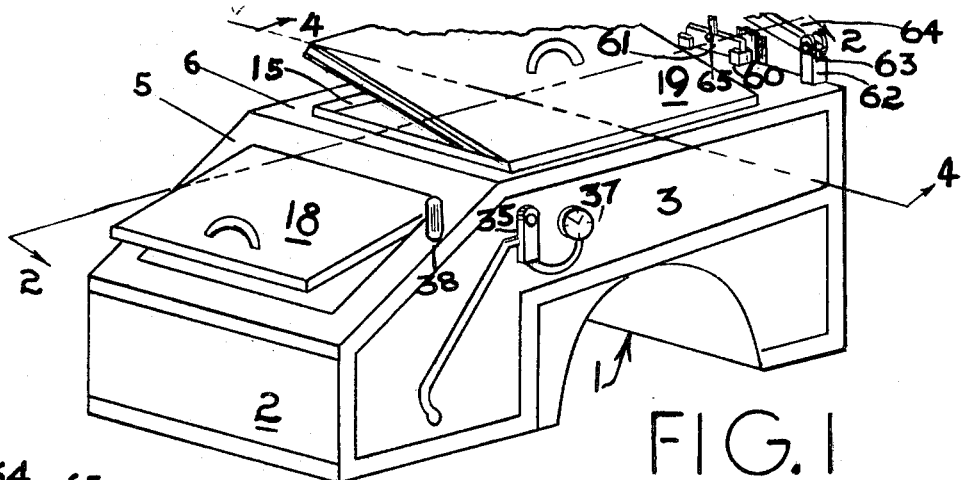
FIG. 1 is a view in perspective of the barbecue oven of my invention.
Figure 2:
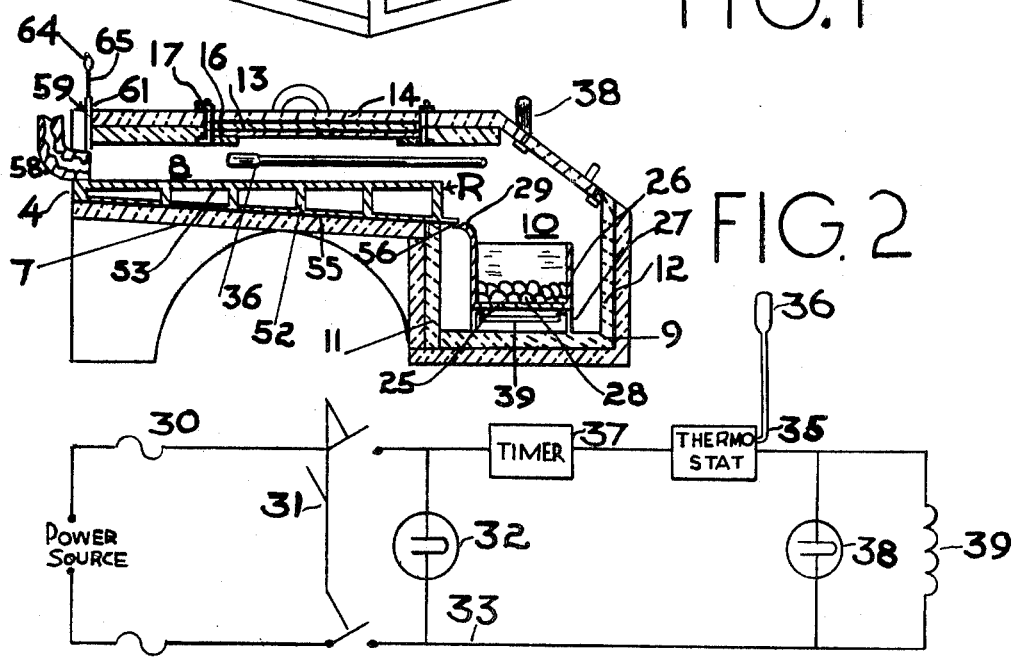
FIG. 2 is a longitudinal sectional view, partially in elevation, taken along lines 2-2 of FIG. 1.

Referring now to the drawings in detail, the barbecue oven 1, contains a front wall 2, sidewalls 3, a rear wall 4, a top inclined wall 5 and a top horizontal wall 6. The floor of the barbecue chamber 8 is contiguous with rear transverse wall 11 of the heat and smoke producing chamber 10. The floor of the heat and smoke producing chamber 10 is illustrated by numeral 9. Chamber 10 is lined with refractory brick on top of a Marinite insulation which is an insulation produced by the Johns-Manville Company.

Located in the top inclined wall 5 and in top horizontal wall 6 are door frames 15 fabricated of aluminum angle members and which contain at the bottom a Transite insulated doorstop 16 which is bolted into place 17 through the angle frame 15. The doors 18 and 19 contain inner core members 13 of the Marinite insulation to which sheets of Transite insulation 14 are adhesively secured. Door 18, which communicates through the top wall 5 is directly over the electrical heating element 39 and the pyrolytic smoke forming surface or drip pan 25 and serves as an access door for cleaning the drip pan 25 or for repairs, if necessary to the heating element 39. Similarly, door 19, is located over the barbecuing chamber 8 for placing meat onto the racks R in the barbecuing chamber 8.

Racks R are supported in the barbecuing chamber 8 on frame 50 which consists of lower longitudinal angle members 51, upright posts 52 and top longitudinal angle members 53. The top longitudinal members 53 are maintained in spaced relation by transverse members 54. The racks R, supported on the frame 50, are over the inclined floor 7 of the barbecuing chamber 8, to which has been added a sheet metal floor 55 having a lip 56 which extends over the lip 29 of peripheral flange 26 of the drip box 25. Thus, as the meat on the racks R cooks, grease and drippings from the meat gravitationally fall to the sheet metal floor 55 and then flow along the inclined floor into the drip pan forming a pyrolytic smoke forming surface 25. The support 27 for the drip pan 25 allows the drip pan to be removed from the heating chamber 10 periodically, for cleaning. The pyrolytic smoke forming surface is further extended through the use of pieces of refractory brick 28, such as volcanic rock onto which the meat drippings and grease drip during the cooking operation. In one embodiment the drip pan 25 is stamped from light gauge aluminum sheet stock or from heavy gauge aluminum foil so that the entire drip pan 25 may be periodically discarded and a new one installed.

Figure 3:
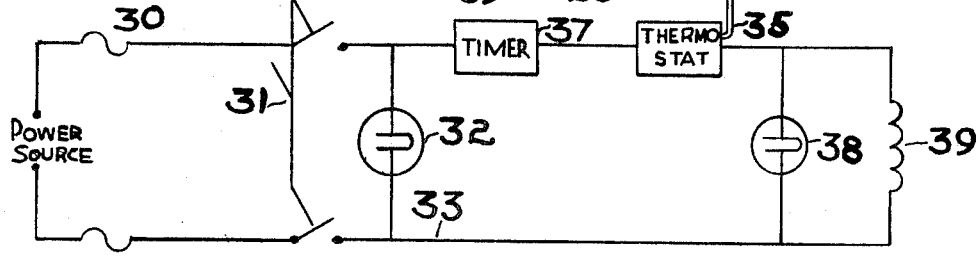
FIG. 3 is a wiring diagram, illustrating the electrical heating element, the thermostatic control and the timing mechanism.
Figure 4:
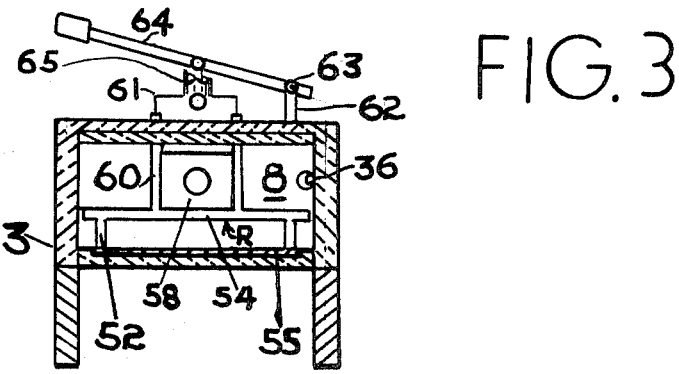
FIG. 4 is a sectional view, taken along lines 4-4 of FIG. 1 and illustrating the relation of the meat racks to the floor of the barbecuing chamber and the relation of the flue and the damper to the barbecuing chamber.

Referring now in some detail to FIG. 3, power is fed to the electrical heating element 39 from the power source through heavy duty fuses 30 and the flow of power is controlled by the double-pole single-throw switch 31 to leads 33. Connected across leads 33 is an indicator light 32 to indicate whether power is available for the unit. A thermostat 35, containing a thermocouple prod 36, which projects into the barbecuing oven 8, senses the temperature in the oven and thus cuts off the current when a predetermined temperature is reached and switches the current back into operation when the temperature in the barbecuing oven falls below a specified level. A timing mechanism 37 is connected into the electrical circuit so that the oven will be in operation for a specified length of time as desired by the operator. An indicator lamp 38 is connected across the leads 33 to indicate when the heating coil 39 is in operation.

Because of the fact that an electrical heating element is utilized rather than charcoal coals, the danger of grease fires, which has plagued prior art closed unit barbecuing ovens, is minimized. The necessity of oxygen or air intake in the front of the unit is eliminated and an exhaust flue 58 is provided merely to direct the excess smoke formed in the oxygen poor atmosphere to a desired point away from the restaurant. A guillotine type damper 59 consists of a steel plate 61 which slides in channel members 60 and is controlled by handle 64 pivotably attached to clevis bracket 62 by clevis pin 63 and connected to the damper plate 61 by means of linkage 65 so as to be positively opened and closed as desired to evacuate smoke, as for example, when door 19 is opened.

OPERATION

When the unit is desired to be placed into operation, meat, preferably brushed with barbecue sauce is placed onto the horizontally disposed racks R through access door 19. Thereafter, the door 19 is securely closed against the Transite doorstops 16 so that the doors are essentially sealed against escape or introduction of air. The thermostat 35 is set at a specified temperature and the timer is set for a specified time and thereafter switch 31 is closed so that power may flow through the circuit to the heating coil 39. In one embodiment, barbecue sauce may be added to the drip pan 25 at the beginning of the cooking cycle so as to evaporate and permeate the meat in cooking chamber 8 as the heating coil 39 goes into operation.

As the meat begins to cook, fat and drippings gravitationally fall from the meat racks onto the sheet metal floor 55 and flow over the projecting lip 56 to fall into the drip pan 25 formed by the sheet metal floor 25 and the vertical peripheral flange or walls 26. The drip lip 29 prevents any drippings or fat from falling into the bottom of the heating chamber and in proximity to the electrical heating element 39. The grease and meat drippings fall on the pyrolytic surface 25 formed by the sheet metal plate 25, the refractory pieces 28 and the vertical walls 26. Upon being heated to the proper pyrolytic temperature by heating element 39, the hydrocarbons in the fat and drippings are pyrolyzed to form smoke which flows into the barbecuing chamber 8 and around and into the meat on the racks R. As the pyrolysis continues, sufficient smoke is formed so that some begins to seep through any cracks surrounding the access doors 19 and 18. At this point, damper handle 64 is raised just a fraction so that the metal plate damper 61 opens the exhaust flue opening 58 so that a wisp of smoke appears in the outlet of the exhaust flue. Thereafter, the restaurant proprietor may go home and return at the specified time to find the meat completely cooked and smoked to a turn. At that point, switch 31 may be opened and the power supply cut off completely and the damper handle 64 raised to allow the smoke within the barbecuing chamber 8 to be evacuated through flue 58 before opening of the meat access doors 19 to remove the cooked barbecue. The proper temperature in the barbecuing chamber ranges from about 225°—250° and the scheduled time for chicken or ribs is generally from 3 to 4 hours. On the other hand, if pork picnic or shoulders are used the cooking time is normally about 8 hours. If a brisket of beef is cooked, the cooking time is normally about 8 hours, and if a beef rump is barbecued, the cooking time is again about 8 hours or overnight.

By use of this invention, it is possible for a proprietor of a restaurant to place a pork shoulder or beef rump into the barbecue chamber on racks R on the night before the barbecue is served, and return the following morning to find the meat perfectly cooked when he arrives. By use of this invention, there is provided a means and apparatus where meat may be easily, quickly and economically barbecued without constant attention, without increasing the staff and without undue shrinkage of the meat and without encountering the problems of grease fires and grease disposal which have been problems with closed units. Further, there is no danger of finding that the fire has gone out while the oven was unattended overnight or of finding the meat seared on one side and undercooked on the other, nor is there any danger of undue dryness of the cooked meat.

I claim:
1. A barbecuing oven for barbecuing meat, which comprises:
   A. an essentially gastight housing including front, side, rear and top, insulated walls and a floor, said housing including:
      1. a heat producing and smoke forming chamber, and,
      2. a barbecuing chamber, said barbecuing chamber being in communication with said heat and smoke forming chamber,
      3. said heat and smoke forming chamber including:
         a. an electrical heating element, and,
         b. a pyrolytic smoke forming surface mounted in proximity to said heating element, said pyrolytic smoke forming surface being heated by said heating element;
      4. said barbecuing chamber, including:
         a. racks for supporting meat to be barbecued, and,
         b. means for directing drippings from said meat to said pyrolytic smoke forming surface, and,
   B. An access opening in said housing for introduction and removal of meat from said oven.

2. A barbecuing oven, as defined in claim 1, in which said pyrolytic smoke forming surface includes a metal plate interposed between said means for directing drippings and said heating element so that said pyrolytic surface receives and pyrolizes drippings to form smoke and prevents drippings from coating the heating element.

3. A barbecuing oven, as defined in claim 2, in which said metal plate has a peripheral upturned flange.

4. A barbecuing oven, as defined in claim 3, in which the pyrolytic smoke forming surface includes pieces of refractory material on said metal plate.

5. A barbecuing oven, as defined in claim 1, in which:
   A. said barbecuing chamber is vertically spaced above said heat producing and smoke forming chamber.

6. A barbecuing oven, as defined in claim 5, in which:
   A. said racks are vertically spaced above the floor of said barbecuing chamber, and,
   B. said floor is inclined toward said pyrolytic, smoke forming surface.

7. A barbecuing oven, as defined in claim 1, the further combination therewith of an exhaust flue in communication with said barbecuing chamber to direct excess smoke away from said chamber.

8. A barbecuing oven, as defined in claim 7, the further combination with said exhaust flue of a damper which in full closed position effectively seals said flue.

9. A barbecuing oven, as defined in claim 1, the further combination with said electric heating element of a thermostat in electrical interconnection therewith and which includes a thermal sensing means located in said barbecuing chamber.

10. A barbecuing oven, as defined in claim 1, the further combination with said electrical heating element of a timing mechanism which is electrically interconnected with said electrical heating element.

11. A barbecuing oven, as defined in claim 1, in which said pyrolytic smoke forming surface is a drip pan fabricated of light gauge aluminum sheet material, which is removable and disposable from said heat producing and smoke forming chamber.